United States Patent
Atmur

(10) Patent No.: US 6,331,759 B1
(45) Date of Patent: *Dec. 18, 2001

(54) PULSE DRIVE ANGLE MEASUREMENT SYSTEM AND METHOD

(75) Inventor: Robert James Atmur, Whittier, CA (US)

(73) Assignee: The Boeing Company, Seattle, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,807

(22) Filed: Apr. 27, 1999

(51) Int. Cl.$^7$ ...................................... G05B 1/06
(52) U.S. Cl. ..................... 318/661; 318/652; 318/605; 318/660; 341/112; 341/116
(58) Field of Search .................. 318/661, 660, 318/654, 652, 605; 341/112, 116

(56) References Cited

U.S. PATENT DOCUMENTS

| | | |
|---|---|---|
| 2,650,352 | 8/1953 | Childs . |
| 2,671,892 | 3/1954 | Childs . |
| 3,247,504 | 4/1966 | Emmerich . |
| 4,207,505 * | 6/1980 | Falck et al. ..................... 318/595 |
| 4,334,179 | 6/1982 | Grimes et al. . |
| 4,390,865 | 6/1983 | Lauro . |
| 4,396,885 | 8/1983 | Constant . |
| 4,472,669 * | 9/1984 | Denham et al. ..................... 318/661 |
| 4,511,884 | 4/1985 | Serev et al. . |
| 4,857,926 | 8/1989 | Neglia et al. . |
| 4,970,450 | 11/1990 | Karl et al. . |
| 4,989,001 | 1/1991 | Serev . |

(List continued on next page.)

FOREIGN PATENT DOCUMENTS

| | | | |
|---|---|---|---|
| 10111145 A | 4/1998 | (JP) . | |
| 11289717-A * | 10/1999 | (JP) | ..................... H02K/11/00 |

OTHER PUBLICATIONS

Chapple; International Search Report; Dec. 1, 2000; 4 pages.

Primary Examiner—Robert E. Nappi
Assistant Examiner—Edgardo San Martin
(74) Attorney, Agent, or Firm—Alston & Bird LLP

(57) ABSTRACT

A resolver system and method is provided for determining the angle position of a shaft. The resolver system includes a resolver having first and second output windings and an input or reference winding spaced apart from the first and second output windings, where either the input winding or the output windings are connected to the shaft. When a drive signal is introduced into the input winding, it generates first and second output signals on the output windings representing the angle position of the shaft. The resolver system of the present invention further includes a processor connected to the output windings for receiving the first and second data signals from the resolver and determining the angle position of the shaft. For generating the drive signal, the resolver system further includes a drive circuit connected to the input winding of the resolver. The drive circuit generates a pulsed drive signal for input into the resolver. This pulsed drive signal generates a large amplitude signal, thereby eliminating the need for gain amplifiers on the output windings of the resolvers, which can introduce electrical noise and require impedance matching. Additionally, the resolver system of the present invention may also include a demodulator connected to the output windings of the resolver that is synchronized with the drive circuit. In this embodiment, the demodulator connects the output windings to the processor when a pulse is input by the drive circuit, thereby eliminating noise in the data signals. Additionally, the duty cycle of the drive signal may be controlled so as not to exceed the resolver's power rating.

51 Claims, 7 Drawing Sheets

U.S. PATENT DOCUMENTS

| | | |
|---|---|---|
| 5,134,397 * | 7/1992 | Eyerly et al. ........................ 341/116 |
| 5,155,696 | 10/1992 | Shibata et al. . |
| 5,196,776 | 3/1993 | Shipley . |
| 5,204,603 | 4/1993 | Taylor et al. . |
| 5,241,268 | 8/1993 | Lee . |
| 5,339,030 * | 8/1994 | Hayashi .......................... 324/207.23 |
| 5,455,498 * | 10/1995 | Kakimoto et al. ................... 318/605 |
| 5,684,719 * | 11/1997 | Anagnost ............................. 364/559 |

* cited by examiner

PULSE DRIVE ANGLE MEASUREMENT SYSTEM AND METHOD

FEDERALLY SPONSORED RESEARCH OR DEVELOPMENT

This invention was made with government support under F04701-96-C0044 awarded by the Air Force. The government has certain rights in this invention.

FIELD OF THE INVENTION

The method and apparatus of the present invention relate generally to determining the angle position of a rotational mechanical member. More particularly, the apparatus and method of the present invention relate to providing an input drive signal to a resolver and thereafter processing the output of the resolver to measure the angle position of a rotational mechanical member.

BACKGROUND OF THE INVENTION

Many types of modem machinery today include rotational mechanical members used to perform various tasks. For example, in the manufacturing setting, rotational mechanical members are used as robotic arms to manipulate workpiece material or to position manufacturing tools such as drills and welders in relation to workpieces. In addition to use in manufacturing, rotational mechanical members are also used in a wide variety of other applications, such as angle positioners for view finding equipment and angle selectors for artillery firearms.

Important to most of these applications, is the accurate determination of the angle position of the mechanical members. This angle position information is used in determining the overall position of the mechanical member and its positional relationship with respect to either workpieces or targets. To determine angle position, many applications use resolver devices that are connected to the rotational end of the mechanical members and provide angle information concerning the rotational position of the mechanical members. A common resolver device used for these applications is an Inductosyn™ resolver manufactured and distributed by Farrand Controls located in Valhalla, N.Y.

A typical resolver, such as the Inductosyn™ resolver, contains a series of electrical coils that are used to determine the angle position of a rotational mechanical member or shaft to which the resolver is connected. Specifically, the resolver includes a set of first and second output windings (also known as cosine and sine windings) and an input or reference winding that is spaced apart from the first and second output windings. Importantly, the position of the first and second output windings relative to the input winding defines the angle position of the shaft.

To determine the angle position of the shaft, a continuous sinusoidal voltage is typically input into the input winding. Through electrical induction, the voltage from the input winding is transferred to the first and second output windings, which, in turn, generate first and second output signals. The first and second output signals generally represent the cosine and sine of the angle of the rotational mechanical member. To determine the angle, these two signals are analyzed using a resolver-to-digital converter (RDC) or similar angle determination circuit that performs a calculation on the signals and in a closed loop system increments or decrements a counter register indicating the current angle measurement of the mechanical member.

Although resolvers typically provide accurate angle information, there are some drawbacks to their use and also to the precision to which the angle measurement is determined. Specifically, typical resolvers such as Inductosyn™ resolvers use air core transformer designs. These air core transformer designs produce low inductance coupling between the input winding and the first and second output windings. As such, the resolver experiences unacceptable power loss from the input windings to the output windings. This power loss typically causes several problems with implementation of the resolver in terms of efficiency, heating, impedance matching, and introduction of noise.

For instance, a typical air core transformer generally used in resolvers has a coupling ratio from the input coil to the output coils of 150–200:1. As such, for every volt input into the resolver the output windings output a voltage in the range of 0.006 to 0.005 volts. This poor coupling between the input and output windings is compensated for in most resolver systems by the use of gain amplifiers that are connected to the output windings for gaining the first and second output signals prior to input in the RDC or similar angle determining circuit for determining the angle measurement. Although the gain amplifiers compensate for the low coupling ratio of the resolver, the use of gain amplifiers in the resolver system does have some drawbacks and limitations.

Specifically, in typical electronic applications there must be proper impedance matching between different electrical components to achieve desired performance. However, the impedance output of gain amplifiers changes with the amount of amplification the amplifiers have been set to amplify. Impedance matching problems become troublesome when the gain amplifiers are set to large gains. As such, in resolver systems that require large magnitude gain amplifiers, the RDC or similar angle determining circuit and the gain amplifiers of the resolver system must be adjusted on a system by system basis to ensure that proper impedance matching is achieved. This can be time consuming during manufacture of the resolver systems and also in later recalibration of the systems. Further, because the amplifiers and the RDC circuit have to be impedance matched, conventional revolver systems do not allow several resolvers to be multiplexed with one RDC or similar type angle determining circuit.

Additionally, gain amplifiers are typically susceptible to the introduction of signal noise that can affect the resolution of the angle measurement. Noise such as input capacitance and electrical capacitance from spurious signal sources, (e.g., 60 Hz power source), can be introduced into the data signals from the output windings of the resolver. Due to the large magnitude of gain supplied by the gain amplifiers, the electrical noise present on the input of the amplifier is significantly amplified. This amplification of the signal noise further causes the relatively small magnitude electrical data signals from the output windings of the resolver to be obscured by the larger magnitude electrical noise.

Noise problems associated with the amplifiers may be exacerbated by the use of continuous input signals and the continuous connection of the output windings of the resolver to the RDC or similar angle determining circuit. Specifically, the continuous connection of the resolver to the RDC allows all electrical noise to be introduced into the output signals.

In addition to the amplification problems associated with the poor coupling of the input and output windings, there are also problems associated with the power ratings of the resolvers. Specifically, the typical reference coil of a resolver has an impedance that is mostly resistive and typically on the order of 2 ohms or less. Because of the low resistance of the input coil, the input drive signal power can exceed 2 watts with only an input of 2 volts (e.g., power= volt$^2$/resistance). The problems associated with the input power characteristics are exacerbated by the fact that typical resolver systems use a continuous sinusoidal input signal for angle measurement. This continuous signal exerts a constant signal on the resolver that can damage the resolver if the amplitude of the input signal is relatively large. As such, due to the low power rating and the continuous input signal, a lower voltage input signal must be used in conventional resolver systems to ensure that the resolver does not experience failure.

The requirement for a lower voltage has a two-fold effect. First, as stated earlier, due to the poor coupling problems of the resolver, a higher voltage input is desired, but is limited by potential for failure of the resolver at these high voltages. A second additional problem is that typical power supplies used to power the machinery surrounding the resolvers and thus, typically used as power supplies for the resolvers are 12 and 24 volt supplies, which is well above the power rating limits for continuous voltage input of the resolvers. As such, in implementation, the input signal supplied by the conventional 12 and 24 volt supplies must be reduced before input into the resolver. The reduction of the signal input creates a power loss that can be 4 to 6 times the power required for the device.

An additional concern connected with the poor coupling of the input and output windings of the resolver is the overall energy consumption of each resolver. This is especially troublesome in situations where the power supplied to the resolvers is a temporary energy source such as a battery pack. In these situations, the continuous analog input signal used by typical resolver systems will significantly reduce the lifetime of the energy source. At least one resolver system has attempted to conserve energy consumed by the resolvers in situations in which the resolver is operating on auxiliary or batter power. Specifically, this resolver system uses a trapezoidal input signal that approximates the analog sinusoidal waveform typically used as an input to the resolver. The resolver system also uses a reduced sampling rate for sampling the output signals from the output windings. The use of the trapezoidal input signal and the reduced sampling rate allegedly conserves the energy consumed by the resolver system.

However, the use of the trapezoidal input drive signal does have some drawbacks that may be unacceptable in resolver system applications. Specifically, the trapezoidal waveform supplies an almost continuous input signal to the resolver so as to approximate the usual analog input signal. As such, not only does the trapezoidal signal consume energy because of its almost continuous signal characteristics, the trapezoidal input signal may also cause damage to the resolver, because of the power rating characteristics of the resolvers. Additionally, this resolver system does not receive precise angle measurements when utilizing the trapezoidal signal. Specifically, the trapezoidal signal may saturate the gain amplifiers making precise measurement of the signals output by the output windings unobtainable. In this instance, the resolver system can only determine whether the output signals are positive or negative. This at best allows the system to only resolve the quadrant of the angle of the shaft and not a precise angle measurement.

An additional problem associated with conventional resolver systems is the use of individual drive circuits, amplifiers, and RDC circuits for each resolver in a manufacturing application. Individual components are generally used because the resolver systems use continuous analog inputs and also require individual gain and impedance matching for each amplifier and RDC circuit or similar type angle determining circuit. The use of individual components for each resolver can become quite costly and also add to the overall size of machinery. Further, because of the high gains, off-the-shelf or legacy components may not operate in the resolver system, thereby requiring specifically designed components. Additionally, many movable mechanical members of machinery have multiple shafts each having several axis of rotation. As such, each axis of rotation may require a resolver. Thus, the number of resolvers for each moveable mechanical member may become large, and having individual, specialized components for each resolver will add to the cost and size of the machinery.

SUMMARY OF THE INVENTION

As set forth below, the apparatus and method of the present invention for determining the angle position of a shaft overcome many of the deficiencies identified with conventional resolver systems. In particular, the apparatus and method of the present invention provide a pulsed input drive signal to the input or reference winding of a resolver. The pulsed input signal can alleviate problems associated with gain amplification, noise, and impedance matching because the amplitude of the input pulse signal is sufficient to overcome the typically poor coupling of the input and output coils of the resolver and thereby, provides output signals from the output windings that have sufficient amplitude requiring either little or no amplification. As such, concerns with impedance matching and the introduction of electrical noise into gain amplifiers can be alleviated.

These and other advantages are provided, according to the present invention, by a resolver system for determining the angle position of a shaft. The resolver system includes a resolver that is connected to a shaft or other type of rotational mechanical member. The resolver includes a series of coils used for determining the angle position of the shaft. Specifically, the resolver includes a set of first and second output windings and an input winding in electrical inductive communication with the first and second output windings. Either the output windings or the input winding is connected to the shaft such that rotation of the shaft changes the position of the output windings with respect to the input winding. Importantly, the position of the first and second output windings relative to the input winding defines the angle position of the shaft.

The apparatus of the present invention also includes a drive circuit electrically connected to the input winding of the resolver. The drive circuit generates a pulse drive signal for input into the input winding, and based on this pulsed input, the first and second output windings output respective first and second data signals representing the angle position of the shaft. To determine the angle position of the shaft, the resolver system of the present invention further includes a processor connected to the output of the first and second output windings.

In operation, to determine the angle position of the shaft, the drive circuit inputs a pulse drive signal into the input winding of the resolver. As the input signal propagates through the input winding, an inductive electrical field generates an electrical signal on the first and second output windings of the resolver. These output signals represent the angle position of the shaft. The processor receives the first and second data signals from the output windings and determines the angle position of the shaft. As such, the angle position of the shaft can be determined with reduced gain.

Due to the reduced gain needed, there is a general reduction in noise input, and also less consideration for impedance matching with gain amplifiers.

The apparatus and method of the present invention can also aid in the elimination of electrical noise introduced into the resolver system caused by constant connection of the output windings of the resolver to the processor, RDC, or similar angle determining circuit. Specifically, medium and low frequency noise can be introduced into the output signals of conventional resolver systems because of the continuous connection of the output windings to the processor, RDC, or similar angle determining circuit. One embodiment of the present invention substantially eliminates the introduction of medium and low frequency electrical noise, by providing a demodulator connected to the output windings of the resolver. The demodulator is synchronized with the drive circuit such that the output signal from the resolver is only connected to the processor, RDC, or similar angle determining circuit when a pulse signal is input into the resolver. As such, medium and low frequency noise that would normally be introduced into the system if the output windings were continuously connected to the processor, RDC, or similar angle determining circuit can be substantially eliminated because there is a reduced likelihood that the medium and low frequency noise will be present when the demodulator connects the output windings to the processor, RDC, or similar angle determining circuit.

In addition to utilizing a demodulator, the system and method of the present invention may also include other types of signal filters for removing unwanted noise or portions of the signal that are not of interest. Specifically, in one embodiment of the present invention, the resolver system may further include either a high or low frequency filter or both connected to the output windings of the resolver. These signal filters can filter out both high and low frequency noise that may be introduced into the output signals.

Further, there may be situations where only a portion of the output signals from the windings includes the desired angle information. Specifically, in some embodiments, the resolver may include a distinct frequency characteristic from which the angle measurement of the shaft can be determined by analyzing the portions of the output signals at this frequency characteristic. In these instances, the high and low frequency filters may be used to filter out the unwanted portions of the first and second output signals. As such, the filters output the portion of the signal including the distinct characteristic of the resolver for determining the angle position of the shaft.

In addition to reducing the amount of gain needed for the output signals and the amount of noise introduced into the output signal, the apparatus and method of the present invention can also be tailored to reduce the energy consumed by the resolver and also tailored to meet the power rating requirements of the resolver. As mentioned previously, typical resolver systems have almost pure resistance characteristics, and as such, the amplitude and duration of input voltages must be regulated to ensure that these power ratings are not exceeded thereby, damaging the resolver. Additionally, because of the poor coupling characteristics, unacceptable amounts of energy can be consumed by the resolver, thereby increasing the cost to operate and decreasing the lifetime of auxiliary power supplies (i.e., batteries), if used.

Because the present invention uses a pulsed signal as opposed to most conventional systems that use continuous signals, the duty cycle of the pulse signal can be regulated so as to meet the power rating requirements of the resolver and reduce the energy consumed in making angle measurement determinations. Specifically, in situations where a large amplitude input signal is warranted to eliminate gain amplifiers, the apparatus and method of the present invention further includes a controller for controlling the drive circuit such that drive circuit provides a pulse signal having a large amplitude but with a short pulse duration and an extended period between pulses (i.e., a relatively small duty cycle). As such, the large amplitude input signal can be generated, while the pulse width is kept to a minimum and the duration between pulses is lengthened to ensure that the resolver does not experience overheating or exceed power ratings and also reduce overall power consumption by the system.

In addition to addressing noise, power rating, and energy consumption concerns, the present invention can also provide embodiments for reducing the number of components required to provide angle measurements. Specifically, since the resolver system of the present invention provides a pulsed input signal as opposed to a continuous input signal, a single input drive circuit may be multiplexed with a plurality of resolvers, such that the drive circuit provides a pulse signal to each of the resolvers in a timed sequence. As such, in this embodiment of present invention, the resolver system further includes a multiplexer connected between the input drive circuit and the input windings of a plurality of resolvers. The multiplexer systematically connects the input winding of each resolver to the input drive circuit to thereby provide a pulse signal to each of the resolvers.

Since the input drive circuit provides pulse input signals in sequence to the resolvers, it may be advantageous to also multiplex the output signals from the output windings of each resolver into one processor, RDC or similar angle determining circuit, to thereby further reduce the number of components needed to implement a plurality of resolvers. As such, in this embodiment of the present invention, the resolver system further includes a second multiplexer connected to the output windings of each resolver. The second multiplexer sequentially outputs the output signals for each resolver to the same processor, RDC circuit, or similar angle determination circuit for the determination of the angle associated with each resolver.

As stated previously, in applications where a large amplitude input signal is used, the corresponding signals output from the output windings may saturate the gain amplifiers and the RDC circuits or other angle determination circuits of a conventional resolver system. The present invention can eliminate problems associated with high amplitude output signals by initially digitizing the signals and then processing the signals using angle calculation techniques implemented in software. Specifically, in this embodiment of the present invention, the resolver system further includes an analog to digital (A/D) converter connected to the output windings and an angle determination process implemented via software in either a computer or processor chip. In this embodiment of the present invention, the A/D converter is chosen such that it will convert the high amplitude output signals into digital data words, and the angle determination processor uses the digital data words to determine the angle position of the shaft. As such, output signals having large amplitudes can be received and analyzed without the problems associate with gain saturation.

DETAILED DESCRIPTION OF THE INVENTION

Figure 1:
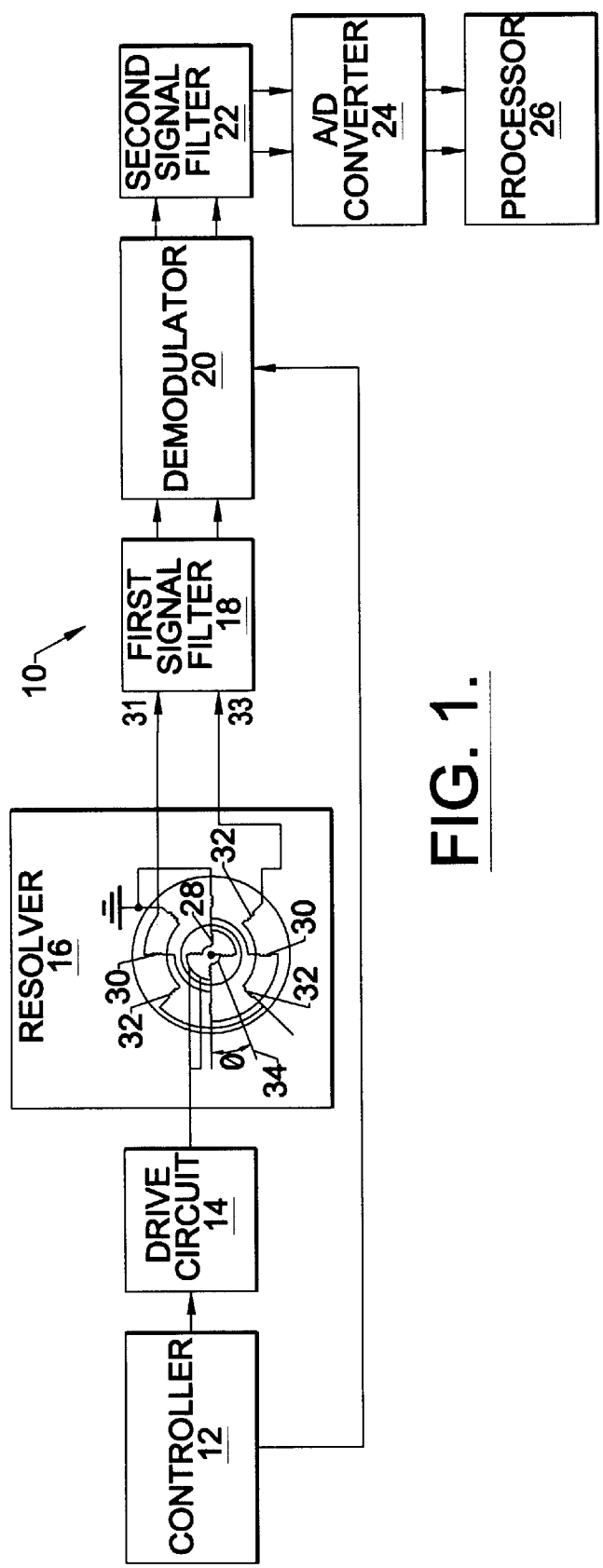
FIG. 1 is a block diagram of the resolver system for determining the angle position of a shaft connected thereto according to one embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The method and apparatus of the present invention are used in conjunction with resolvers for determining the angle position of movable mechanical members used in machinery. As discussed above, these resolvers provide feedback information concerning the angle position of the mechanical members. This information is helpful in determining the spatial relationship between the mechanical members and the workpiece for precise manufacturing procedures. Additionally, resolvers are used in a wide variety of other applications such as angle positioners for view finding equipment and angle selectors for artillery firearms.

A typical resolver used for many applications is a resolver called an Inductosyn™ resolver manufactured and distributed by Farrand Controls located in Valhalla, N.Y. Inductosyn™ resolvers are described in U.S. Pat. Nos. 2,671,892 and 2,650,352 both to Childs, and as such, these patents are incorporated herein by reference. Embodiments of the method and apparatus of the present invention are designed to operate with resolvers such as Inductosyn™ resolvers, and the embodiments discussed below illustrate the present invention in connection with an Inductosyn™-type resolver. However, it must be understood that the resolver system of the present invention may be used with any resolver system.

As discussed previously, the air core transformer design of many resolvers, such as Inductosyn™ resolvers, presents several problems in terms of efficiency, heating, impedance matching, and introduction of noise. Specifically, because the air core transformers have relatively poor inductive coupling, a significant amount of voltage input into the resolver is dissipated in the air core transformer, making the resolver systems less efficient. Also, because of the poor coupling, the signals output by the resolver are relatively small and require gain amplifiers to properly gain the output signals prior to processing. The use of gain amplifiers can increase the noise introduced into the data signals and also require individual calibration to ensure proper impedance matching with the processor, RDC, or similar angle determining circuit. Further, because each angle determining circuit must be calibrated to the gain amplifiers, most conventional systems require individual drive circuits and angle determination circuits, which can increase the overall size and cost of the machinery. Additionally, because the impedance of the resolver is mostly resistive and conventional systems typically use continuous input signals, the input voltage must be kept to a minimum to ensure that the power ratings of the resolver are not exceeded and that the resolver does not consume large amounts of power.

The method and apparatus of the present invention solves many of the these problems by providing a resolver system that supplies a pulsed input signal to the resolver. The pulsed input signal can be controlled such that a large amplitude, low duty cycle, pulsed signal may be input into the resolver. Because the pulse signal has a large amplitude, little or no amplification of the signals output from the resolver is needed. As such, the apparatus and method of the present invention can eliminate problems with the introduction of electrical noise and impedance matching problems associated with large gain amplifiers. Further, because the present invention can control the pulse width and the duration between pulses (i.e., duty cycle), power rating concerns and energy consumption concerns can be alleviated by providing a pulse signal that has a large amplitude but a small pulse width and a relatively large duration between pulses (i.e., low duty cycle). As such, an input signal can be provided with a large amplitude, while at the same time alleviating power rating and energy consumption concerns.

In addition, because the present invention provides a pulsed signal as opposed to a continuous signal, many resolvers can be multiplexed to one drive circuit, which, in turn, delivers input signals to each resolver in timed sequence. Further, because the pulsed signal typically produces an output signal that requires little or no gain, there are typically no impedance matching concerns. As such, the output of the resolvers can be also multiplexed into one processor or similar angle determining circuit, thereby eliminating the number of components needed to implement the resolver systems.

The use of a pulsed signal also helps to alleviate noise in other ways. Specifically, because conventional systems use a continuous signal, the output of the resolver is constantly connected to the processor, RDC, or similar angle determination circuit. This constant connection can allow the introduction of medium and low frequency noise. However, because the present invention uses a pulsed signal, constant connection of the output windings of resolver to the processor, RDC, or similar angle determination circuit is not required. Instead, the connection of the resolver to the processor, RDC, or similar angle determination circuit can be synchronized with the pulsed signal such that the output of the resolver is only connected to the processor, RDC, or similar angle determination circuit when a pulse is input into the resolver. As such, medium and low frequency signal noise is either eliminated or reduced.

Additionally, as discussed previously, conventional resolver systems typically cannot withstand high amplitude output signals as they may saturate the gain amplifiers and angle determination circuits, thereby eliminating precision in the angle measurement. However, one embodiment of the present invention eliminates problems associated with large amplitude output signals by providing an A/D converter and processor connected to the output windings of the resolver. The A/D converter is selected such that it can receive the data signals output from the resolver and convert them to digital data words. The processor receives the digital data words and determines the angle position of the shaft.

With reference to FIG. 1, one embodiment of the resolver system for determining the angle position of a shaft is illustrated. The resolver system 10 of this embodiment includes a resolver 16 having first and second output windings, 30 and 32, respectively and an input or reference winding 28 that is spaced apart from the first and second output windings. The input winding is connected to the rotational end of a shaft 34 and the output windings are in electrical inductive communication with the input winding, where the position of the first and second output windings relative to the input winding defines the angle position of the shaft. To measure this angle position, the resolver system of the present invention further includes a drive circuit 14 electrically connected to the input winding 28 of the resolver 16 and a processor 26 electrically connected to the output windings, 30 and 32, of the resolver.

Figure 2:
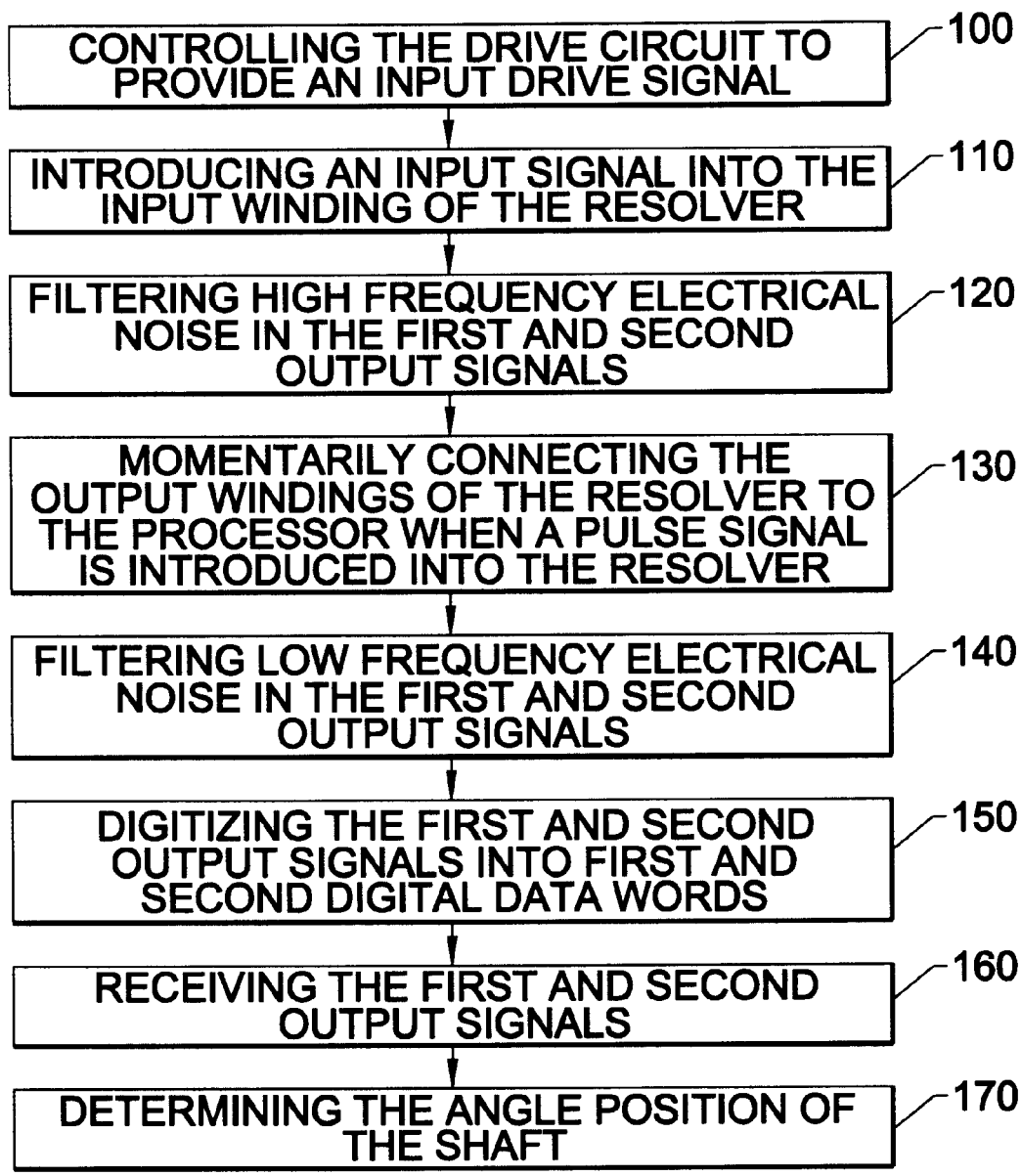
FIG. 2 is an operational block diagram of the operations performed for determining the angle position of a shaft connected to a resolver according to one embodiment of the present invention.

With reference to FIG. 2, in operation, the drive circuit 14 introduces a pulsed input drive signal to the input winding 28 of the resolver 16. (See steps 100 and 110). In turn, the first and second output windings, 30 and 32, of the resolver produce first and second output signals, 31 and 33, representing the angle measurement of the shaft connected to the resolver. The processor 26 receives the first and second data signals, (See step 160), and determines the angle measurement of the shaft. (See step 170). The processor may next store the angle measurement of the shaft in a memory device. Because the resolver system of the present invention uses a pulsed drive signal having a relatively large amplitude, the resolver system of this embodiment needs little or nor amplification of the signals output from the resolver, thereby eliminating problems with the introduction of electrical noise and impedance matching.

In the above embodiment, the input winding is connected to the shaft and the output windings are spaced apart from the input winding. However, it must be understood that the present invention is not limited to this configuration of the resolver. Specifically, in some embodiments of the present invention, the output windings may be connected to the shaft and the input winding may be spaced apart from the output windings.

As described above, the drive circuit outputs a pulsed signal. It must be understood that any type of circuit may be used to generate the pulsed drive signal. For instance, in one advantageous embodiment, the drive circuit includes a logic field-effect transistor (FET) for generating a pulse drive signal. Specifically, in one advantageous embodiments, the drive circuit includes a metal oxide field-effect transistor (MOSFET) operated in saturation and controlled with the controller to generate pulse signals.

An advantage to using logic FETs and, more particularly, MOSFETs for the drive circuit is that a MOSFET used as a pulse generator has energy saving characteristics. Specifically, in the "off" position of the MOSFET, there is little to no current leakage in the MOSFET. As such, the MOSFET has little or no energy consumption in the "off" position. Likewise, in the "on" position, the MOSFET has little resistance and as such, has little or no energy loss when current flows through the channel of the MOSFET.

Further, as discussed above, the processor determines an angle position for the shaft based on the first and second output signals from the resolver. In contrast to previous systems which could only determine angle quadrant of the shaft, the present invention can provide precise angle measurements of the shaft's position. Specifically, in some embodiments of the present invention, the processor can determine the angle measurement of the shaft with a precision in the range of 2 to 3 microradians.

As discussed previously, the continuous connection of the output windings of the resolver to the processor or any other angle determination circuit may allow electrical noise to be introduced into the output signals of the resolver. The resolver system of the present invention remedies the problems associated with the introduction of noise by controlling the connection of the output windings 30 and 32, to the processor 26, such that the output windings are only connected to the processor or other determining circuit when a drive signal is input into the resolver. As such, medium and low frequency noise is not introduced into the output signals.

Specifically, with reference to FIG. 1, one embodiment of the present invention further includes a demodulator 20 connected to the output windings, 30 and 32, of the resolver 16 for controllably connecting the output windings to the processor 26. In one an advantageous embodiment, the resolver system of the present invention further includes a controller 12 connected to both the input drive circuit 14 and the demodulator 20.

With reference FIG. 2, in operation, the controller controls both the drive circuit and the demodulator. Specifically, the controller controls the drive circuit to input a pulse drive signal into the resolver while at the same time controlling the demodulator to momentarily connect the output windings of the resolver to the processor, RDC, or similar angle determining circuit. (See steps 100 and 130). Because the connection between the output windings and the processor are only made when a drive signal is provided to the resolver, the demodulator creates a narrow bandwidth system that substantially eliminates medium and low frequency noise so that it is not introduced into the first and second data signals. Because the connection between the resolver and the processor is only for a short duration of time, there is less probability that a medium or low frequency noise signal will be introduced into the output signals.

For instance, in typical embodiments, the controller controls the demodulator such that it connects the output of the resolver to the processor for only the duration or pulse width of each pulse signal sent. As such, the duration of the connection between the resolver and the processor is typically 1–10 microseconds in duration. As such, the demodulator will eliminate electrical noise signals having frequencies in the range of 50 KHz to DC level. However, it must be understood that the frequency range of noise that can be eliminated is not limited to this range and is dependent on the frequency of the "on" and "off" switching of the demodulator and the duration of time that the demodulator is "on" (i.e., connecting the output windings to the processor).

Although any type of demodulator device may be used, in one advantageous embodiment, the demodulator comprises a two-pole, dual throw analog switch that connects the output windings of the resolver to the processor. The demodulator may also comprise a transistor switch or logic FET that is controlled electrically by the controller.

Although a demodulator may be used in conjunction with the drive circuit to reduce the introduction of electrical noise, there may be instances where the resolver system does not include a demodulator or where added devices are needed, in addition to the demodulator, to filter electrical noise. With reference to FIG. 1, in these embodiments, the resolver system 10 may further include a first signal filter 18 connected to the output windings, 30 and 32 of the resolver. With reference to FIG. 2, the first signal filter 18 filters high frequency electrical noise that may be present in the output signals. (See step 120). In instances where the embodiment further includes a demodulator 20, connected to the first signal filter, the first signal filter 18 filters out electrical noise that is greater than the frequency of the on and off switching and duration of the on time of the demodulator. Specifically, in some advantageous embodiments, the first signal filter 18 filters frequencies in the range of 5–10 MHz. As such, the first signal filter filters high frequency noise and the demodulator prevents the introduction of medium and low frequency noise into the output signals, thereby producing a narrow bandwidth system.

In addition to filtering high frequency noise, there may also be instances where it is advantageous to filter out medium or low frequency noise either in place of the demodulator or in conjunction with the demodulator. As such, with reference to FIG. 1, according to one embodiment of the present invention, the resolver system 10 further includes a second signal filter 22 connected either to the output windings, 30 and 32, of the resolver or to the output of the demodulator 20. With reference to FIG. 2, in operation, the second signal filter receives the first and second output signals either from the resolver or the demodulator and filters the data signals to remove medium or low frequency signal noise. (See step 140). Although the second signal filter can be selected to filter a broad range of frequencies, in some advantageous embodiments, the second signals filter filters frequencies in the range of 200–500 Hz.

The output signals from the output windings, 30 and 32, of the resolver are typically in analog form. However, in embodiments where a digital processor is used to determine the angle position of the shaft, it is advantageous to convert or digitize the output signals prior to determining the angle measurement. With reference to FIG. 1, in some embodiments the resolvers system 10 of the present invention further includes an analog to digital (A/D) converter 24 electrically connected to the output windings of the resolver 16. With reference to FIG. 2, in operation, the A/D converter receives the analog first and second output signals from the resolver and digitizes the output signals into digital data words. (See step 150). The processor 26 receives the digital data words representing the first and second output data signals and determines the angle position of the shaft. (See steps 160 and 170).

In addition to digitizing the first and second output signals from the output windings of the resolver, the combination of the A/D converter 24 and the processor 26 also accommodate instances where the output signals have relatively large amplitudes. Specifically, as stated previously, many conventional resolver systems require the use of gain amplifiers to amplify the output signals. Although the gain amplifiers can amplify a range of output signal amplitudes, if the amplitude of the output signals exceeds the range of the gain amplifiers, the gain amplifiers will saturate and may not output a proper gained signal. This may present a problem where a relatively large amplitude, pulsed input signal is used because the output signals from the resolver in response to the pulsed input signal may saturate the amplifiers and prevent the RDC or similar angle determining circuit from properly determining the angle position of the shaft. It may also saturate several of the components of the RDC circuit due to the closed loop system.

The present embodiment of the present invention, however, can eliminate the problems associated with saturation of the angle determining circuits of conventional resolver systems due to large amplitude output signals by first using the controller 12 to provide a pulsed input signal having sufficient amplitude such that the resolver system does not require gain amplifiers to amplify the output signals. As such, problems with saturation of amplifiers is negated. Additionally, the resolver system 10 of the present embodiment further includes an A/D converter 24 connected to the output windings, 30 and 32, of the resolver 16. The A/D converter converts the first and second output data signals into digital data words. Importantly, the A/D converter is chosen such that it is not saturated by the large amplitude output signals. As such, the A/D converter can provide digital data words accurately representing the first and second output signals to the processor 26 for determining the angle position of the shaft.

With reference to FIG. 1, as discussed above, the input winding 28 of the resolver is connected to the shaft and rotate in relation to the output windings as the shaft rotates. The orientation of the output windings in relation to the input winding defines the angle position of the shaft. Thus, when a signal input into the input winding creates an inductive force on the output winding coils, the output winding windings, in turn, output voltage signals that are proportional to the amount of inductive force received from the input winding. This inductive force will be different depending on the orientation of the output windings to the input winding. As such, the first and second output signals from the output windings of the resolver will represent the orientation of the output windings to the input winding and thereby, represent the angle position of the shaft. Specifically, in some embodiments of the present invention, the voltage output from one of the output windings will represent the sine of the angle position of the shaft and the output signal from the other output winding will represent the cosine of the angle position of the shaft.

To determine the angle position of the shaft in this embodiment, the processor 26 of the present invention receives the first and second output signals, one signal representing the sine and the other the cosine of the angle, and the processor determines the angle position of the shaft by performing an arctangent function on the first and second output signals. To determine the angle position of the shaft, the processor uses a four quadrant arctangent function of the ratio of the sine and cosine values. Specifically, merely taking the arctangent of the sine and cosine values from the output windings would give an angle measurement but would not inform the system as to which quadrant the shaft is located. As such, in addition to taking the arctangent of the angle, the processor also evaluates the sign of the cosine and sine values from the output windings to determine which quadrant the angle is located and thereby provide the angle position of the shaft.

Although the embodiment illustrated uses an arctangent function to determine the angle position of the shaft, it must be understood that the processor of the present invention may be designed to determine the angle position of the shaft in a number of other manners from the output signals. Specifically, in some embodiments, the output signals of the resolver may represent different values of the angle of the shaft depending on the design of the resolver. As such, the processor can be tailored to perform the proper calculations on the output signals.

Additionally, it must be understood that in the above embodiment, the arctangent function is a ratio metric relationship of the first and second output signals. In other words, the magnitudes of the first and second output signals are always proportional regardless of their actual magnitude. As such, the resolver system of the present invention is not concerned with properly regulating the amplitude of the input signal to ensure that a proper calculation of the angle is made. Instead, the limitations on the amplitude of the input signal is limited only by the power rating requirements of the resolver and the amplitude of the power source used to provide the input for drive circuit. In typical embodiments, the amplitude of the pulse is in the range of 0 to 1500 volts.

In one embodiment of the present invention, the output signals from the output windings of the resolver are defined by the following equation:

$$COS=\cos(\text{shaft angle})*A*\sin(\omega*t)*\text{coupling ratio}$$

$$SIN=\sin(\text{shaft angle})*A*\sin(\omega*t)*\text{coupling ratio}$$

Where:
COS and SIN are the outputs at the COS and SIN output windings, respectively;
cos(shaft angle) is the cosine of the rotational angle of the shaft;
sin(shaft angle) is the sine of the rotational angle of the shaft;
A is the peak amplitude of the drive wave form;
$\sin((\omega*t))$ is the reference drive sine wave; and
Coupling ratio is the ratio of output voltage to input voltage when the COS or SIN of the shaft angle is 1.

This equation implies that the factor cos(shaft angle) is fixed for any drive frequency over a wide band due to the air core design of the transformer. Frequency independence allows the drive signal to contain any number of frequencies and still provide rotational position measurement. There are limits not expressed in the equation where stray capacitance begins to dominate the transformer coupling, however in the frequencies of interest this is not a factor. The drive wave form can then be rewritten to include n number of harmonics.

$$\text{Drive wave form}=\Sigma_{1-n}A_n*\sin(n*\omega*t)$$

This is a Fourier series and can represent any periodic wave form. The invention uses a periodic low duty cycle pulse train of high peak amplitude. The peak outputs, using this drive signal, of the COS and SIN outputs are evaluated during the drive pulse duration.

$$COS=\cos(\text{shaft angle})*A_{peak}*\text{coupling ratio}$$

$$SIN=\sin(\text{shaft angle})*A* \sin(\omega*t)* \text{coupling ratio}$$

Measuring the COS output with the demodulation device, the COS output will be the cos of the shaft angle times a constant. The larger the peak voltage the less gain will be required to overcome the loss due to the coupling ratio and provide good signal to noise ratio for the analog to digital conversion. The demodulation device is operated from the drive command and performs a synchronous sampling demodulation of the sensed output. The demodulator output is filtered to limit the noise bandwidth. The filter output is proportional to the cos of the shaft angle.

As discussed previously, a typical resolver has mostly a resistive impedance. Because of the low resistance of the input winding of the resolver (i.e., typically 2 ohms), the input drive signal power can exceed 2 watts with an input of only 2 volts (i.e., power=volt$^2$/resistance). The problems associated with the input power characteristics may be exacerbated by the fact that typical resolver systems use a continuous sinusoidal input signal for angle measurement. As such, due to the low power rating and the continuous input signal, a lower voltage input signal must be used in conventional resolver systems to ensure that the resolver is not overheated and does not experience failure. However, as discussed previously, it is advantageous to introduce a large input signal into the resolver such that gain amplifiers are not required on the output windings. Additionally, the large voltage losses due to poor coupling in the air core transformer can also consume large amounts of energy.

With reference to FIG. 1, to provide a large amplitude signal, while also meeting the power rating requirements of the resolver and also conserving energy, one embodiment of the present invention further includes a controller 12. The controller is connected to the drive circuit 14 and controls the pulse signal input into the input winding 28 of the resolver. In particular, the controller of the present embodiment, regulates the drive circuit to produce a pulse signal having a large amplitude, such that large gain amplifiers are not needed and little or no gain is required for processing the output signals. However, to ensure that the power rating of the resolver is not exceeded and also to conserve energy in the resolver system, the controller also controls the pulse width and duration between pulses (i.e., duty cycle) of the input drive signal such that the resolver is not damaged and uses less energy as opposed to conventional systems that provide continuous or nearly continuous input signals.

Figure 3:
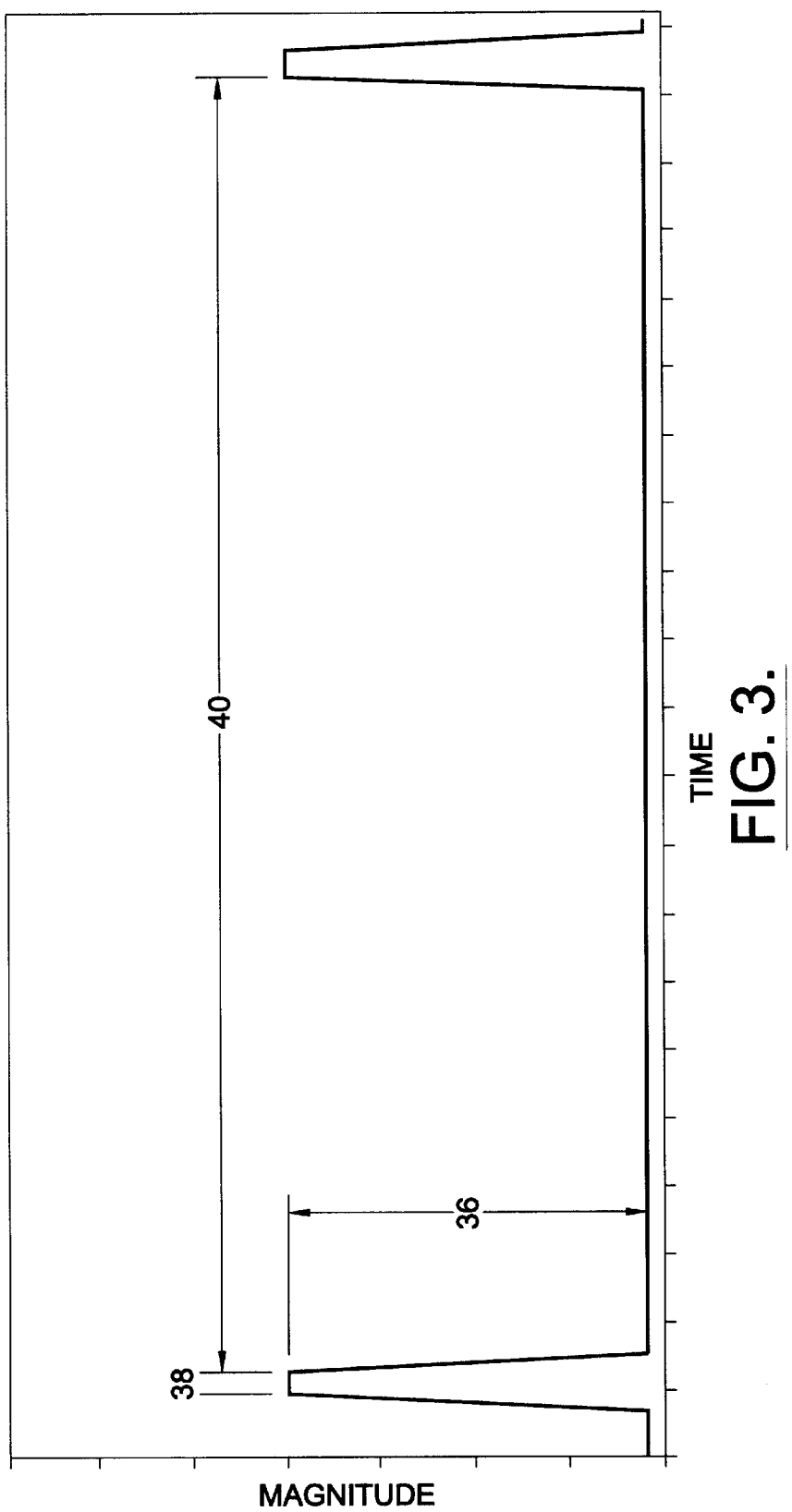
FIG. 3 is a graphical representation of an input pulse signal used by the resolver system to determine the angle position of a shaft connected to a resolver according to one embodiment of the present invention.
Figure 4:
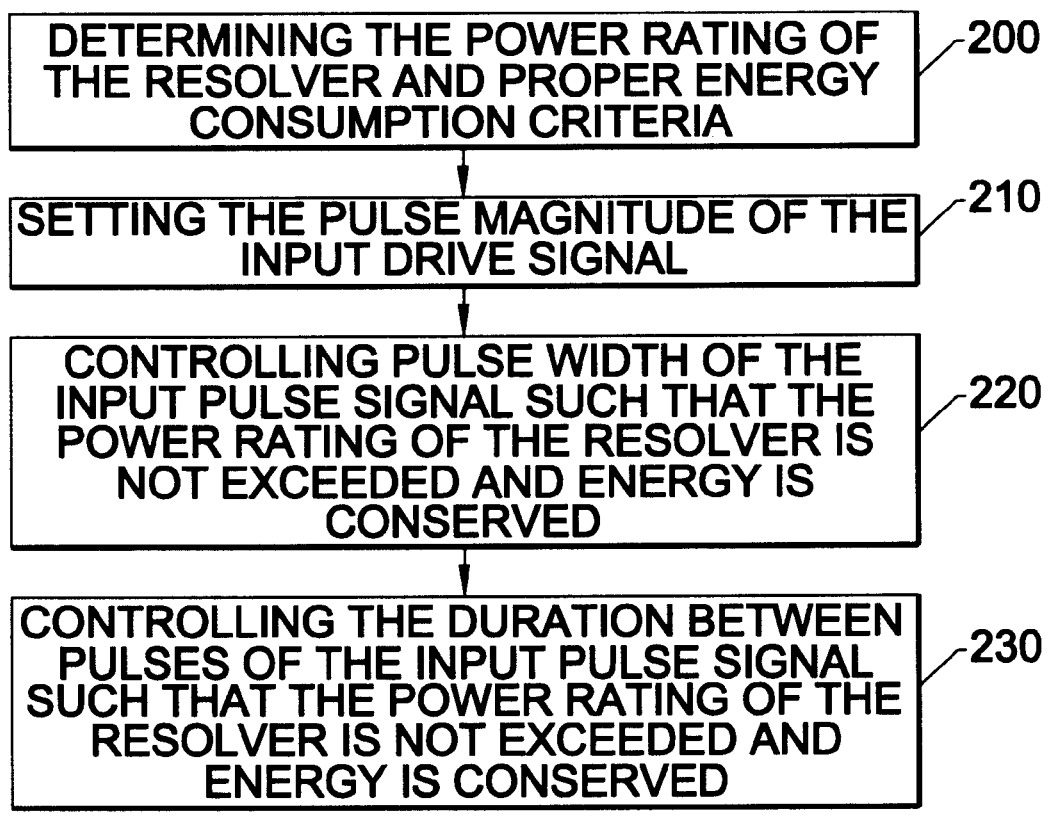
FIG. 4 is an operational block diagram of the operations performed for controlling the amplitude and pulse width of a pulse and the duration between pulses of a pulse drive signal used as input to a resolver according to one embodiment of the present invention.

Specifically, with reference to FIG. 3, a typical input pulse drive signal according to one embodiment of the present invention is illustrated. The input pulse signal is defined by an amplitude 36, a pulse width 38, and a duration 40 between pulses. With reference to FIG. 4, the controller compensates for the power rating of the resolver by first determining the power rating of the resolver and by determining a criteria set by a user for conserving energy consumed by the resolver. (See step 200). The controller next sets the pulse amplitude 36 of the input drive signal such that little or no gain amplification is needed on the output signals of the resolver. (See step 210). To ensure that the power rating of the resolver is not exceeded and to conserve energy, the controller also controls the pulse width 38 and the duration between pulses 40. (See steps 220 and 230).

As discussed above, the pulse amplitude, pulse width, and duration between pulses can be controlled to ensure that power ratings are not exceeded and to conserve energy. Although the pulse width of the input drive signal can be regulated to any width, in typical embodiments, the pulse width is in the range of 1–10 microseconds. Further, although the duration between pulses may be set to any duration, in typical embodiments, the duration between pulses is 100 to 10,000 microseconds. As also mentioned, the magnitude of the input signal can be regulated to ensure that the power rating of the resolver is not exceeded and that the resolver does not consume unneeded energy.

To further describe the regulation of the pulse amplitude, pulse width, and duration between pulses to ensure that power ratings are not exceeded, the following example is provided. For simplification, this example describes the calculations for the pulse width in a purely resistive system. As stated previously, the input or reference winding of a typical resolver has approximately 2 ohms of resistance. As such, the introduction of a 1 volt input signal will result in a power of 500 milliwatts (e.g., $V^2/R$). However, if the power rating of the resolver is a maximum of 25 milliwatts, the introduction of a continuous volt input signal will exceed the power of rating of the resolver. The present invention can eliminate the problems associated with the reduced power rating of the resolve by regulating the pulse amplitude, pulse width, and duration between pulses to ensure that the power rating of the resolver is not exceeded.

Specifically, to resolve this problem, it must be initially understood that if the input voltage was continuous the power would be 500 milliwatts. To have a 25 milliwatt power, however, the resolver system can only receive the 1 volt input signal for 25/500 or 1/20th of the time. As such, the pulse width can not exceed 1/20 of the entire duration between pulses or cycle of the pulse signal. Thus, if the duration between pulses is 10 millisecond then the pulse width can be no more than 1/20 of 10 millisecond or 500 microseconds for a 1 volt pulse amplitude. To further illustrate this point, if the duration between pulses is kept at 10 milliseconds, but the pulse amplitude is 10 volts, then the pulse width is 5.0 microseconds, and if the pulse amplitude was 100 volts, the pulse width would 0.05 microseconds maximum.

As discussed, the above example illustrates the calculations of the pulse width for use in a purely resistive system. However, it must be understood that most resolver systems will not have a purely resistive system due to the inductance characteristics of the input or reference windings. Specifically, typical resolver systems have a 0 to 5 micro-Henry inductance. Although this inductance is generally negligible and typically does not affect the signal input into the resolver, as the pulse width of the input signal narrows the effects of this inductance is more pronounced. In particular, at narrower pulse widths, the impedance will lower the peak power input into the system. This reduction in peak power input allows increased pulse widths, (i.e., pulse widths of longer duration than the pulse widths in the above example), without exceeding the power ratings of the resolver. As such, one skilled in the art will understand that the particular pulse widths used for a particular system will be dependent upon the reactance of the specific resolver system.

Although many conventional resolver systems have power ratings that can withstand short pulse width pulses having amplitudes from 0 to 1500 volts, some resolver systems may have much lower power ratings. In embodiments using these lower power rating resolvers, input signals having large amplitudes are unacceptable. The resolver system may not withstand input signal amplitudes that would allow the elimination of large gain amplifiers. Thus, resolver systems are needed that will eliminate noise associated with the amplifiers and provide accurate angle measurement of the shaft position. As such, one embodiment of the present invention utilizes the specific frequency characteristics of the resolver instead of large amplitude input signals to determine the angle position of the shaft. Specifically, the specific frequency characteristics can be isolated from the rest of the output signal and analyzed to determine the angle measurement.

In this embodiment to determine the angle position of the shaft, the resolver system of the present invention uses signal filters to create a narrow bandwidth resolver system that filters out all portions of the first and second output signals from the resolver not containing the frequency characteristics of the resolver. As such, the processor or other angle determination circuit can determine the angle position of the shaft based only on the portion of the signals containing the frequency characteristics of the resolver.

Figure 5:
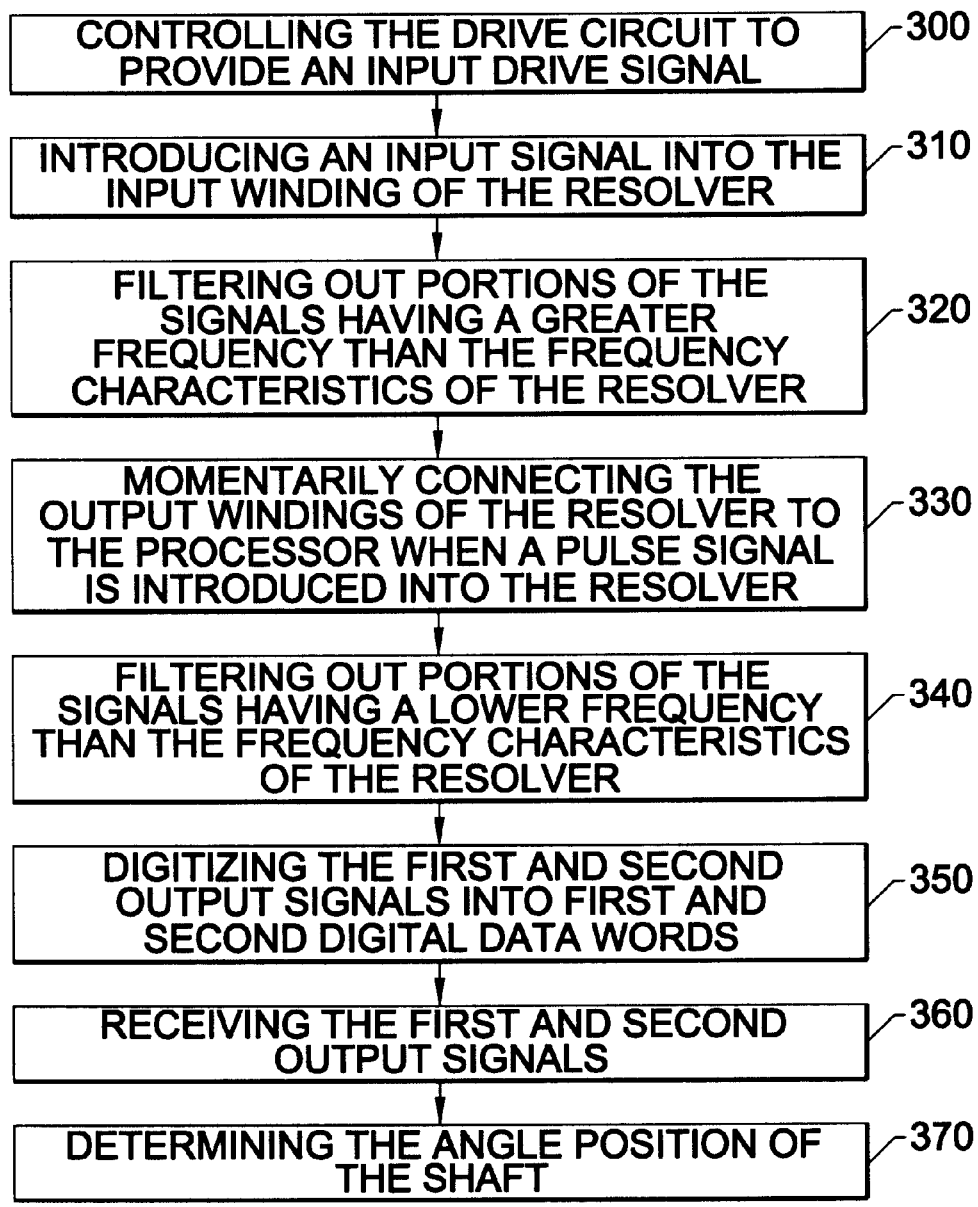
FIG. 5 is an operational block diagram of the operations performed for determining the angle position of a shaft connected to a resolver having a specific frequency characteristic by filtering out portions of the output signal above and below the frequency characteristic of the resolver according to one embodiment of the present invention.

With reference to FIG. 1, the resolver system of this embodiment includes a controller 12, drive circuit 14, resolver 16, first signal filter 18, second signal filter 22, A/D converter 24, and a processor 26. Additionally, the resolver system of this embodiment may also include a demodulator 20 or an amplifier, not shown. With reference to FIG. 5, in operation, the controller controls the drive circuit to input an input drive signal that does not exceed the power ratings of the resolver. (See steps 300 and 310). The output windings, 30 and 32, of the resolver output first and second output signals containing the frequency characteristics of the resolver. The first signal filter 18 receives the first and second output signals and filters out portions of the signals that have a greater frequency than the portion of the signals containing the specific frequency characteristics of the resolver. (See step 320). If the embodiment includes a demodulator, the demodulator 20 controllably connects the output windings to the processor 26. (See step 330). The second signal filter 22 receives the first and second data signals from either the first signal filter or the demodulator and filters out portions of the signals that have a lower frequency than the portion of the signals containing the specific frequency characteristics of the resolver. (See step 340). As such, only the portion of the first and second data signals containing the frequency characteristics of the resolver are provided to the processor. Specifically, the A/D converter 24 receives the first and second data signals and digitizes them into first and second data words. (See step 350). The processor receives the data words and determines the angle position of the shaft based on the specific frequency characteristics of the resolver. (See steps 360 and 370).

Specifically, in one embodiment of the present invention, the processor uses standard Fourier transform techniques on the first and second output signals to determine the angle position of the shaft. In particular, the resolver will have a natural response to the input signal that will be reflected in the frequency characteristics of the resolver. The filters filter out portions of the signal other than the frequency characteristics of the resolver, and the processor performs a discrete Fourier transform on this portion of the signal to determine the angle position of the shaft.

Typical machinery will have several movable members and will require several resolver systems. Because conventional resolver systems typically require individual drive circuits and angle determining circuits, these resolver systems can increase the overall cost and size of the machinery. Specifically, typical resolver systems require gain amplifiers to gain the signals output from the resolver. As such, each resolver system must be impedance matched with the angle determining circuits. Thus, typical resolver systems include an individual angle determining circuit. Additionally, because most conventional resolver systems provide a continuous drive signal to the resolver, each resolver system also includes an individual drive circuit.

The resolver system of the present invention, however, eliminates many of the problems associated with having multiple drive circuits and angle determining circuits.

Specifically, because the drive circuit of the present invention inputs a pulsed input signal typically having a duty cycle of less than 50%, as opposed to a continuous input signal, one drive circuit can be used with several resolvers and can provide input signals to each resolver in sequence. Further, because the drive signal input by the resolver system of the present invention has a large amplitude, the resolver systems typically require little or no gain. As such, impedance matching is of little or no concern and one processor or angle determining circuit can be used with several resolvers.

Figure 6:
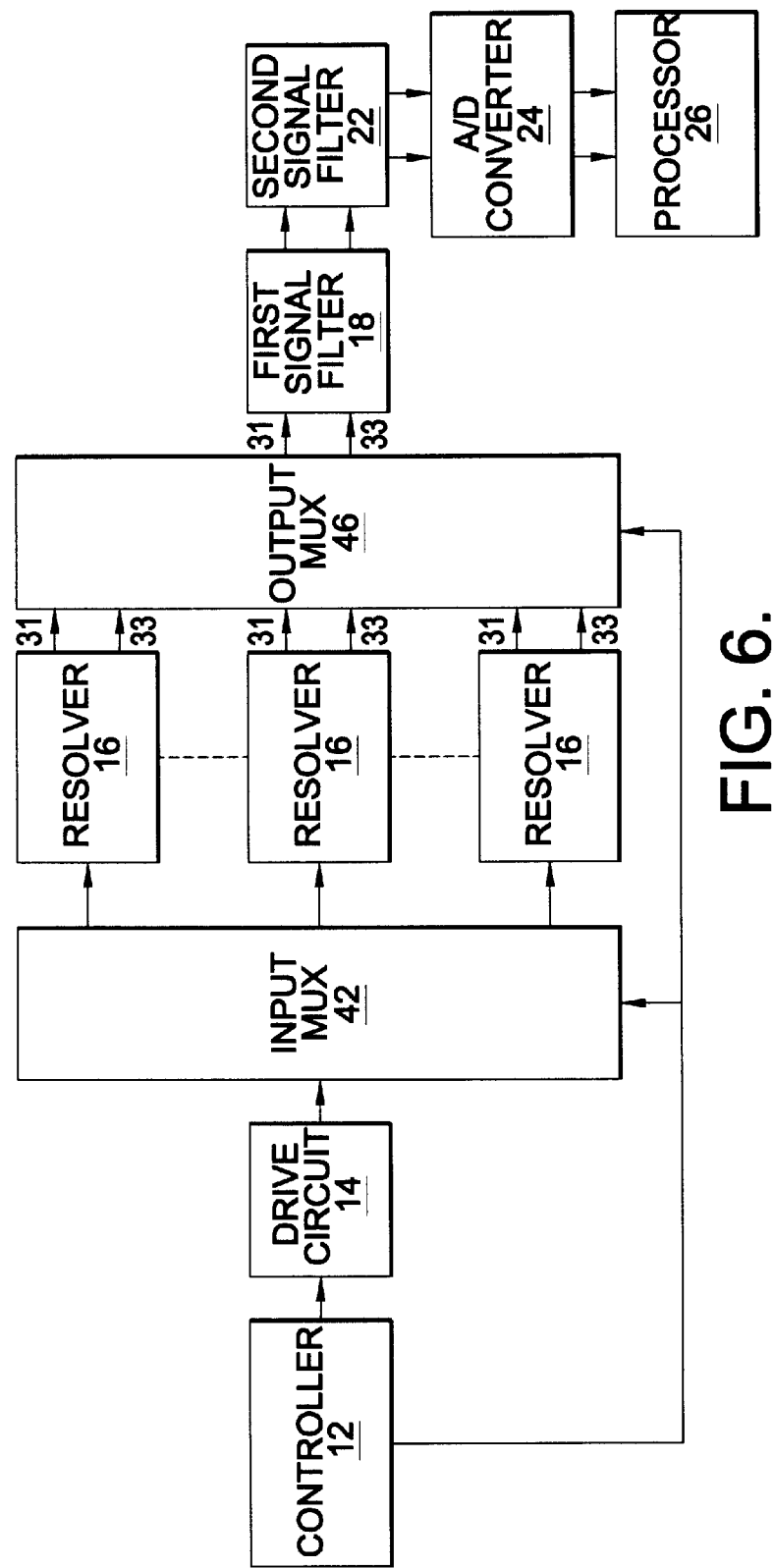
FIG. 6 an operational block diagram of the operations performed for determining the angle position of a shaft connected thereto by multiplexing several resolvers to one drive circuit and to one processor according to one embodiment of the present invention.

With reference to FIG. 6, the resolver system of this embodiment includes a controller 12 and a drive circuit 14 for producing an input drive signal for a plurality of resolvers. Connected to the output of the drive circuit is an input multiplexer 42. The input multiplexer controllably connects the output of the drive circuit to a plurality of resolvers. Connected to the output windings of each of the plurality of resolvers is an output multiplexer 46. The output multiplexer controllably connects each of the output windings of the plurality of resolvers to the processor 26 such that the same processor can determine the angle position of each shaft associated with each resolver. An A/D converter 24 is connected to the output multiplexer 46 and digitizes the first and output signals for each resolver as they are received from the second multiplexer. Connected to the output multiplexer 46 are also first 18 and second 22 signal filters for filtering noise from the output signals and a processor 26 for determining the angle position of the shaft.

Figure 7:
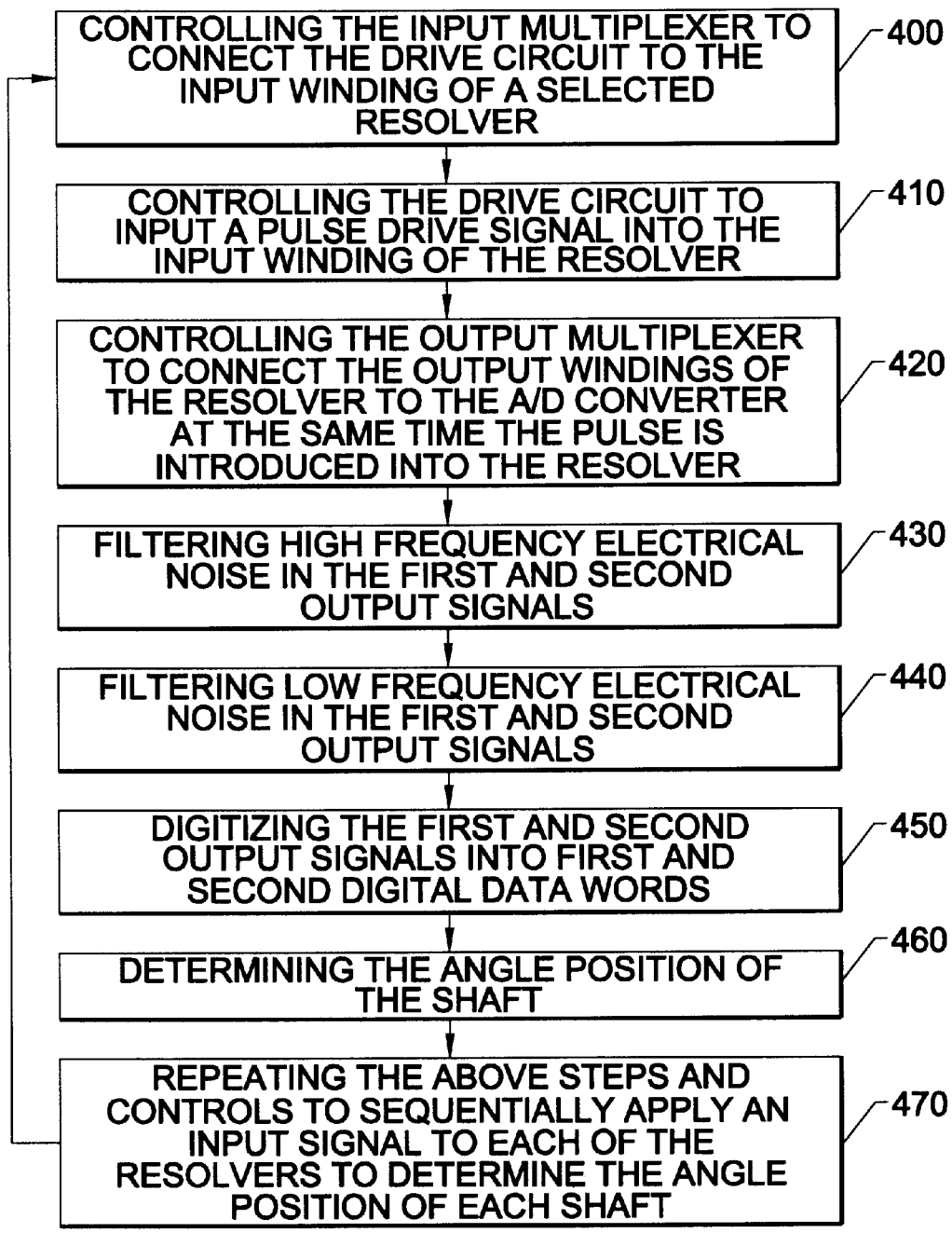
FIG. 7 is a block diagram of the resolver system for determining the angle position of a shaft connected thereto, where the resolver system includes multiplexers for connecting several resolvers to one drive circuit and to one processor according to one embodiment of the present invention.

With reference to FIG. 7, in operation, the controller controls the input multiplexer to connect to the input winding of a selected resolver. (See step 400). The controller then controls the input drive circuit to input a pulse drive signal into the resolver. (See step 410). The controller also controls the output multiplexer to connect the output windings of the resolver to the A/D converter at the same time the pulse is sent to reduce the introduction of noise into the output signals. (See step 420). The signal input into the input winding of the resolver causes the output windings of the resolver to output first and output data signals, which are provided by the output multiplexer to the first and second filter. The first and second signal filters filter out frequency noise. (See step 430 and 440). The A/D converter receives the first and second output signals and digitizes the signals into first and second digital data words. (See step 450). Finally, the processor receives the digital data words and determines the angle position of the shaft associated with the resolver. (See step 460). The controller repeats the above steps and controls the drive circuit and input and output multiplexers to sequentially apply an input signal to each of the plurality of resolvers and determine the angle position of each shaft associated with each resolver. (See step 470).

As discussed above, the present embodiment allows several resolvers to be multiplexed with one drive circuit and one processor. It must be understood that the timing sequence used to provide input signals to each resolver may be any desired sequence. For instance, in some embodiments, some of the resolvers may require a more frequent input signal than others. In these embodiments, the multiplexers may be controlled such that the multiplexers intermittently connect the drive circuit to the resolvers requiring lower frequencies of input in between connecting the input drive circuit to the resolvers having higher frequency input requirements. Further, because the processor must process signals for the plurality of resolvers, the resolver system may further include buffers either in or connected to the output multiplexer for retaining representations of the first and second output windings for each resolver, to allow delay time for the processor to determine the angle position for each shaft associated with each resolver. Additionally, because the output multiplexer and the drive circuit are controlled by the controller, the output multiplexer can act as a demodulator to eliminate medium and low frequency noise.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A resolver system for determining an angle position of a shaft comprising:

an air-core resolver connected to the shaft having first and second output windings and an input winding in electrical inductive communication with the first and second output windings, wherein rotation of the shaft changes the position of the first and second windings with respect to input winding, and wherein the position of the first and second output windings relative to the input winding defines the angle position of the shaft;

a drive circuit electrically connected to the input winding of said resolver, wherein said drive circuit generates a pulse drive signal for input into the input winding, and wherein the first and second output windings output respective first and second data signals representing the angle position of the shaft, wherein said pulse drive circuit provides a pulse drive signal having individual pulses with amplitudes and widths that are selected based on power input requirements of the system and the withstanding voltage of the resolver; and a processor electrically connected to the output of the first and second output windings, wherein said processor receives the first and second data signals from the output windings and determines the angle position of the shaft, wherein said drive circuit generates a pulse drive signal having a sufficient amplitude such that said processor determines the angle position of the shaft from the first and second data signals independent of an amplifier.

2. A system according to claim 1 further comprising a demodulator electrically connected to the output windings of said resolver, wherein said demodulator controllably transmits the first and second data signals output from the output windings of said resolver to said processor.

3. A system according to claim 2, wherein said demodulator is synchronized with said drive circuit such that when said drive circuit generates a pulse drive signal for input into the input winding of said resolver and said demodulator transmits the first and second data signals output from the resolver to said processor to thereby reduce the introduction of signal noise into the data signals.

4. A system according to claim 2, wherein the first and second output windings output respective first and second data signals within a predetermined frequency range, and wherein said system further comprises a first signal filter electrically connected to the first and second output windings of said resolver, and wherein said first signal filter filters the first and second data signals to remove portions of the signals having frequencies above the predetermined frequency range prior to input of the first and second data signals into said demodulator.

5. A system according to claim 4 further comprising a second signal filter electrically connected to the output of said demodulator, wherein said second signal filter filters the first and second data signals to remove portions of the signals having frequencies below the predetermined frequency range prior to input of the first and second data signals into said processor.

6. A system according to claim 1 further comprising a signal filter electrically connected to the output windings of said resolver, wherein said signal filter filters the first and second data signals to remove noise present in the data signals.

7. A system according to claim 1 further comprising a converter electrically connected to the first and second output windings of said resolver, wherein said converter converts the first and second data signals into the first and second digital data signals.

8. A system according to claim 7, wherein said converter converts the first and second data signals into first and second digital data words, and wherein said processor processes the first and second digital data words to determine the angle position of the shaft.

9. A system according to claim 1, wherein the first and second data signals output from the first and second output windings of said resolver represent cosine and sine values of the angle position of the shaft, respectively, and wherein said processor determines the angle position of the shaft by performing an arctangent function on the first and second data signals.

10. A system according to claim 1 further comprising a memory device electrically connected to the processor, wherein said processor stores the angle position of the shaft determined from the first and second data signals.

11. A system according to claim 1, wherein said pulse drive circuit comprises a field-effect transistor connected to said input winding for generating a pulse drive signal.

12. A system according to claim 1, wherein said pulse drive circuit generates a pulse drive signal having a series of pulses, and wherein the amplitude and width of the individual pulses of the pulse drive signal are selected based on power input requirements of the resolver.

13. A resolver system for determining an angle position of a shaft comprising:
an air-core resolver connected to the shaft having first and second output windings and an input winding in electrical inductive communication with the first and second output windings, wherein rotation of the shaft changes the position of the first and second windings with respect to input winding, and wherein the position of the first and second output windings relative to the input winding defines the angle position of the shaft;
a pulse drive circuit electrically connected to the input winding of said resolver, wherein said pulse drive circuit generates a pulse drive signal having a series of pulses for input into the input winding, wherein said pulse drive circuit is variable such that it is capable of providing individual pulses of the pulse drive signal having amplitudes and widths that are selected based on power input requirements of the system and the withstanding voltage of the resolver, wherein said pulse drive circuit is capable of providing a pulse drive signal with individual pulses having an amplitude of up to 1500 volts, and wherein the first and second output windings output respective first and second data signals representing the angle position of the shaft; and
a processor electrically connected to the output of the first and second output windings, wherein said processor receives the first and second data signals from the output windings and determines the angle position of the shaft, wherein said drive circuit generates a pulse drive signal having a sufficient amplitude such that said processor determines the angle position of the shaft from the first and second data signals independent of an amplifier.

14. A resolver system for determining an angle position of a shaft comprising:
an air-core resolver connected to the shaft having first and second output windings and an input winding in electrical inductive communication with the first and second output windings, wherein rotation of the shaft changes the position of the first and second windings with respect to input winding, and wherein the position of the first and second output windings relative to the input winding defines the angle position of the shaft;
a pulse drive circuit electrically connected to the input winding of said resolver, wherein said pulse drive circuit generates a pulse drive signal having a series of pulses for input into the input winding, wherein the amplitude and width of the individual pulses of the pulse drive signal are selected based on power input requirements of the resolver, wherein the pulse width of the individual pulses of the pulse drive signal is in the range of 1 to 10 microseconds in duration, and wherein the first and second output windings output respective first and second data signals representing the angle position of the shaft; and
a processor electrically connected to the output of the first and second output windings, wherein said processor receives the first and second data signals from the output windings and determines the angle position of the shaft.

15. A system according to claim 1 further comprising an amplifier electrically connected to the first and second output windings of the resolver, wherein said amplifier amplifies the first and second data signals prior to input into said processor.

16. A system according to claim 1, wherein said resolver has a distinct frequency characteristic, wherein said system further comprises a signal filter electrically connected to the first and second output windings of said resolver, wherein said signal filter filters the first and second data signals and outputs the portion of the data signals containing the frequency characteristics of the resolver, and wherein said processor receives the first and second data signals from the signal filter and determines the angle position of the shaft.

17. A system according to claim 16, wherein said resolver has a maximum power input requirement, and wherein said drive circuit generates a pulse drive signal containing a plurality of pulses, each having an amplitude below the maximum power input requirement of said resolver.

18. A system according to claim 16 further comprising an amplifier connected to the first and second output windings of the resolver, wherein said amplifier amplifies the first and second data signals prior to input into said processor.

19. A method for determining an angle position of a shaft comprising the steps of:
introducing a pulse drive signal into an input winding of an air-core resolver connected to the shaft having first and second output windings and an input winding in electrical inductive communication with the first and second output windings, wherein rotation of the shaft changes the position of the first and second windings with respect to input winding, and wherein the position of the first and second output windings relative to the input winding defines the angle position of the shaft, wherein said introducing step introduces a pulse drive signal having individual pulses with amplitudes and widths that are selected based on power input requirements of the system and the withstanding voltage of the resolver;

receiving respective first and second data signals from the first and second output windings of the resolver, wherein the first and second data signals represent the angle position of the shaft; and determining the angle position of the shaft based on the first and second data signals output from the first and second output windings, wherein said introducing step introduces a pulse drive signal having a sufficient amplitude such that said determining step determines the angle position of the shaft from the first and second data signals independent of an amplifier.

20. A method according to claim 19 further comprising the step of controllably transmitting the first and second data signals output from the output windings of the resolver prior to said receiving step.

21. A method according to claim 20 further comprising the step of synchronizing the step of introducing a pulse drive signal into the input winding of the resolver and the step of transmitting the first and second data signals output from the output windings of the resolver to thereby reduce the introduction of signal noise into the data signals.

22. A method according to claim 20, wherein said receiving step comprises receiving first and second data signals having angle data defined within a predetermined frequency range of the data signals, and wherein said method further comprises the step of filtering the first and second data signals to remove portions of the signals having frequencies above the predetermined frequency range prior to said transmitting step.

23. A method according to claim 22 further comprising the step of filtering the first and second data signals to remove portions of the signals having frequencies below the predetermined frequency range prior to said determining step.

24. A method according to claim 19 further comprising the step of filtering the first and second data signals to remove noise present in the data signals prior to said determining step.

25. A method according to claim 19 further comprising the step of converting the first and second data signals into first and second digital data signals prior to said determining step.

26. A method according to claim 25, wherein said converting step comprises converting the first and second data signals into first and second digital data words, and wherein said determining step comprises determining the angle position of the shaft based on the first and second digital data words.

27. A method according to claim 19, wherein said receiving step comprises receiving respective first and second data signals from the first and second output windings of the resolver, wherein the first and second data signals represent cosine and sine values of the angle position of the shaft, respectively, and wherein said determining step comprises the step of performing an arctangent function on the first and second data signals to determine the angle position of the shaft.

28. A method according to claim 19 further comprising the step of storing the angle position of the shaft determined in said determining step.

29. A method according to claim 19, wherein said introducing step comprises introducing a pulse drive signal into the resolver having a series of pulses.

30. A method according to claim 29, wherein said introducing step further comprises the step of selecting the amplitude and width of the individual pulses of the pulse drive signal based on power input requirements of the resolver.

31. A method for determining an angle position of a shaft comprising the steps of:

introducing a pulse drive signal having a series of pulses into an input winding of an air-core resolver connected to the shaft having first and second output windings and an input winding in electrical inductive communication with the first and second output windings, wherein rotation of the shaft changes the position of the first and second windings with respect to input winding, wherein the position of the first and second output windings relative to the input winding defines the angle position of the shaft, wherein said pulse drive signal comprises a series of pulses, wherein the amplitude and width of the individual pulses of the pulse drive signal are based on power input requirements of the system and the withstanding voltage of the resolver, and wherein said introducing step introduces a pulse drive signal into the input windings of the air-core resolver having an amplitude of up to 1500 volts;

receiving respective first and second data signals from the first and second output windings of the resolver, wherein the first and second data signals represent the angle position of the shaft; and determining the angle position of the shaft based on the first and second data signals output from the first and second output windings, wherein said introducing step introduces a pulse drive signal having a sufficient amplitude such that said determining step determines the angle position of the shaft from the first and second data signals independent of an amplifier.

32. A method for determining an angle position of a shaft comprising the steps of:

introducing a pulse drive signal having a series of pulses into an input winding of an air-core resolver connected to the shaft having first and second output windings and an input winding in electrical inductive communication with the first and second output windings, wherein rotation of the shaft changes the position of the first and second windings with respect to input winding, wherein the position of the first and second output windings relative to the input winding defines the angle position of the shaft, wherein said pulse drive signal comprises a series of pulses, wherein the amplitude and width of the individual pulses of the pulse drive signal based on power input requirements of the resolver, and wherein the pulse width of the individual pulses of the pulse drive signal is in the range of 1 to 10 microseconds in duration;

receiving respective first and second data signals from the first and second output windings of the resolver, wherein the first and second data signals represent the angle position of the shaft; and determining the angle position of the shaft based on the first and second data signals output from the first and second output windings.

33. A method according to claim 19 further comprising the step of amplifying the first and second data signals prior to said determining step.

34. A method according to claim 19, wherein said resolver has a distinct frequency characteristic, and wherein said method further comprises the step of filtering the first and second data signals and outputting the portion of the data signals containing the frequency characteristics of the resolver.

35. A method according to claim 34, wherein said resolver has a maximum power input requirement, and wherein said introducing step comprises introducing a pulse drive signal having a plurality of pulses, and wherein said method further comprises the step of selecting the amplitude of the individual pulses of the pulse drive signal such that the pulses have amplitudes below the maximum power input requirement of the resolver.

36. A method according to claim 34 further comprising the step of amplifying the first and second data signals prior to said determining step.

37. A resolver system for individually determining an angle position for each of a plurality of shafts comprising:

an air-core resolver connected to each of the shafts, wherein each of said resolvers has first and second output windings and an input winding in electrical inductive communication with the first and second output windings, wherein rotation of the shaft changes the position of the first and second windings with respect to input winding, and wherein the position of the first and second output windings relative to the input winding defines the angle position of the shaft;

at least one drive circuit electrically connected to said resolvers, wherein said drive circuit generates individual pulse drive signals for input into the input winding of each of said resolvers, and wherein the first and second output windings for each resolver output respective first and second data signals representing the angle position of the shaft to which the resolver is connected, wherein said pulse drive circuit provides a pulse drive signal having individual pulses with amplitudes and widths that are selected based on power input requirements of the system and the withstanding voltage of the resolver;

an output multiplexer electrically connected to each of the first and second output windings of each of the resolvers, wherein said output multiplexer controllably outputs each of the first and second data signals associated with each resolver; and a processor electrically connected to the output of said output multiplexer, wherein said processor receives the first and second data signals from the output windings of each of the resolvers and determines the angle position of each of the shafts, wherein said drive circuit generates a pulse drive signal having a sufficient amplitude such that said processor determines the angle position of the shafts from the first and second data signals independent of an amplifier.

38. A system for individually determining an angle position for each of a plurality of shafts comprising:

an air-core resolver connected to each of the shafts, wherein each of said resolvers has first and second output windings and an input winding in electrical inductive communication with the first and second output windings, wherein rotation of the shaft changes the position of the first and second windings with respect to input winding, and wherein the position of the first and second output windings relative to the input winding defines the angle position of the shaft;

at least one drive circuit electrically connected to said resolvers, wherein said drive circuit generates individual pulse drive signals for input into the input winding of each of said resolvers, and wherein the first and second output windings for each resolver output respective first and second data signals representing the angle position of the shaft to which the resolver is connected;

an input multiplexer electrically connected to the output of said drive circuit;

an output multiplexer electrically connected to each of the first and second output windings of each of the resolvers, wherein said output multiplexer controllably outputs each of the first and second data signals associated with each resolver; and a processor electrically connected to the output of said output multiplexer, wherein said input multiplexer sequentially electrically connects the output of the drive circuit to the input winding of each resolver, wherein said drive circuit generates individual pulse drive signals for input into each of said resolvers, wherein said output multiplexer outputs each of the first and second data signals associated with each resolver sequentially, and wherein said processor receives the first and second data signals from the output windings of each of the resolvers and determines the angle position of each of the shafts.

39. A system according to claim 37 wherein said output multiplexer is synchronized with said drive circuit such that when said drive circuit generates a pulse drive signal for input into the input winding of one of said resolvers said output multiplexer transmits the first and second data signals output from said resolver to said processor.

40. A system according to claim 37, wherein the first and second output windings for each of said resolvers output respective first and second data signals within a predetermined frequency range, and wherein said system further comprises a first signal filter electrically connected to the output of said output multiplexer, and wherein said first signal filter filters the first and second data signals to remove portions of the signals having frequencies above the predetermined frequency range prior to input of the first and second data signals into said processor.

41. A system according to claim 40 further comprising a second signal filter electrically connected to the output of said first signal filter, wherein said second signal filter filters the first and second data signals to remove portions of the signals having frequencies below the predetermined frequency range prior to input of the first and second data signals into said processor.

42. A system according to claim 37 further comprising a converter electrically connected to the output of said output multiplexer, wherein said converter converts the first and second data signals into the first and second digital data signals.

43. A system according to claim 37, wherein the first and second data signals output from the first and second output windings of each of said resolvers respectively represent cosine and sine values of the angle position of the shaft associated with the resolver, and wherein said processor determines the angle position of the shaft by performing an arctangent function on the first and second data signals.

44. A method for individually determining an angle position for each of a plurality of shafts comprising the steps of:

introducing a pulse drive signal into the individual input windings of a plurality of air-core resolvers, wherein each resolver has first and second output windings connected to a respective shaft and an input winding in electrical inductive communication with the first and second output windings such that the position of the first and second output windings relative to the input winding defines the angle position of the shaft, wherein said introducing step introduces a pulse drive signal having individual pulses with amplitudes and widths that are selected based on power input requirements of the system and the withstanding voltage of the resolver;

receiving respective first and second data signals from the first and second output windings of each of the resolver, wherein the first and second data signals represent the angle position of the shaft associated with each resolver;

multiplexing the first and second data signals from each of the resolvers for sequential determination of the angle associated with each resolver;

controllably transmitting the first and second data signals for each of the resolvers; and determining the angle position of each of the shafts based on the first and second data signals output from the resolver associated with the shaft, wherein said introducing step introduces a pulse drive signal having a sufficient amplitude such that said determining step determines the angle position of the shafts from the first and second data signals independent of an amplifier.

45. A method for individually determining an angle position for each of a plurality of shafts comprising the steps of:

providing a plurality of air-core resolvers each connected to a respective shaft, wherein each resolver has first and second output windings connected to a respective shaft and an input winding in electrical inductive communication with the first and second output windings such that the position of the first and second output windings relative to the input winding defines the angle position of the shaft;

multiplexing the input windings for each of the resolvers for sequential introduction of a pulse drive signal into each resolver;

sequentially introducing a pulse drive signal into the individual input windings of each of said resolvers;

receiving respective first and second data signals from the first and second output windings of each of the resolver, wherein the first and second data signals represent the angle position of the shaft associated with each resolver;

multiplexing the first and second data signals from each of the resolvers for sequential determination of the angle associated with each resolver;

controllably transmitting each of the first and second data signals for each of the resolvers sequentially; and sequentially determining the angle position of each of the shafts based on the first and second data signals output from the resolver associated with the shaft.

46. A method according to claim 44 further comprising the step of synchronizing the step of introducing a pulse drive signal into the input winding of the resolvers and the step of transmitting the first and second data signals output from the resolvers.

47. A method according to claim 44, wherein said receiving step comprises receiving first and second data signals having angle data defined within a predetermined frequency range of the data signals, and wherein said method further comprises the step of filtering the first and second data signals to remove portions of the signals having frequencies above the predetermined frequency range prior to said determining step.

48. A method according to claim 47 further comprising the step of filtering the first and second data signals to remove portions of the signals having frequencies below the predetermined frequency range prior to said determining step.

49. A method according to claim 44 further comprising the step of converting the first and second data signals into first and second digital data signals prior to said determining step.

50. A method according to claim 44, wherein said receiving step comprises receiving respective first and second data signals from the first and second output windings of the resolver, wherein the first and second data signals represent cosine and sine values of the angle position of the shaft, respectively, and wherein said determining step comprises the step of performing an arctangent function on the first and second data signals to determine the angle position of the shaft.

51. A resolver system for determining an angle position of a shaft comprising:

an air-core resolver connected to the shaft having first and second output windings and an input winding in electrical inductive communication with the first and second output windings, wherein rotation of the shaft changes the position of the first and second windings with respect to input winding, and wherein the position of the first and second output windings relative to the input winding defines the angle position of the shaft;

a pulse drive circuit electrically connected to the input winding of said resolver, wherein said pulse drive circuit generates a pulse drive signal having a series of pulses for input into the input winding, wherein the amplitude and width of the individual pulses of the pulse drive signal are selected based on power input requirements of the resolver, wherein said pulse drive circuit is variable such that it is capable of providing individual pulses of the pulse drive signal having amplitudes greater than 14 volts and up to 1500 volts, and wherein the first and second output windings output respective first and second data signals representing the angle position of the shaft; and a processor electrically connected to the output of the first and second output windings, wherein said processor receives the first and second data signals from the output windings and determines the angle position of the shaft.

* * * * *